United States Patent
Hakes

(10) Patent No.: US 11,667,341 B2
(45) Date of Patent: Jun. 6, 2023

(54) TRACK LINK FOR GROUND-ENGAGING TRACK HAVING RAIL PROTRUSION FOR ANTI-SCALLOPING

(71) Applicant: Caterpillar Inc., Peoria, IL (US)

(72) Inventor: David Jennings Hakes, Princeville, IL (US)

(73) Assignee: Caterpillar Inc., Peoria, IL (US)

(*) Notice: Subject to any disclaimer, the term of this patent is extended or adjusted under 35 U.S.C. 154(b) by 657 days.

(21) Appl. No.: 16/713,674

(22) Filed: Dec. 13, 2019

(65) Prior Publication Data
US 2021/0179211 A1 Jun. 17, 2021

(51) Int. Cl.
*B62D 55/20* (2006.01)

(52) U.S. Cl.
CPC .................................. *B62D 55/20* (2013.01)

(58) Field of Classification Search
CPC ...................................................... B62D 55/20
See application file for complete search history.

(56) References Cited

U.S. PATENT DOCUMENTS

| | | | |
|---|---|---|---|
| 2,876,049 A | 3/1959 | Giovanni | |
| 3,851,932 A * | 12/1974 | Story | B62D 55/213 305/202 |
| 3,853,360 A * | 12/1974 | Khuntia | B62D 55/213 305/202 |
| 3,955,855 A | 5/1976 | Massieon et al. | |
| 4,324,437 A | 4/1982 | Narang | |
| 5,704,697 A | 1/1998 | Ketting et al. | |
| 5,887,958 A * | 3/1999 | Bissi | B62D 55/211 305/201 |
| 6,322,173 B1 * | 11/2001 | Maguire | B62D 55/21 305/201 |
| 7,614,709 B2 | 11/2009 | Oertley | |
| 7,798,579 B2 | 9/2010 | Mulligan | |
| 8,100,483 B2 | 12/2012 | Diekevers et al. | |
| 8,905,493 B2 | 12/2014 | Liu | |
| 9,045,180 B2 | 6/2015 | Brewer et al. | |
| 9,290,217 B2 | 3/2016 | Steiner | |
| 9,550,537 B2 | 1/2017 | Steiner et al. | |
| 2014/0001830 A1 * | 1/2014 | Meyer | B62D 55/0887 305/202 |

(Continued)

FOREIGN PATENT DOCUMENTS

DE 10117235 10/2001

OTHER PUBLICATIONS

Kevin Steiner, Specification and Drawings for U.S. Appl. No. 16/113,744 Scallop-Resistant Track Link and Method of Making Same filed Aug. 27, 2018.

(Continued)

*Primary Examiner* — Jacob D Knutson
(74) *Attorney, Agent, or Firm* — Brannon Sowers & Cracraft

(57) ABSTRACT

A ground-engaging track system includes a track having a first track chain and a second track chain, and an idler having pockets formed in an outer idler rim to receive inboard rail protrusions on track links in the first track chain and the second track chain. The inboard rail protrusions project from an inboard link side, and a central pad of an upper rail surface in the track link includes an anti-scalloping bump-out formed on the inboard rail protrusion.

16 Claims, 6 Drawing Sheets

(56) References Cited

U.S. PATENT DOCUMENTS

2018/0057082 A1  3/2018  Johannsen

OTHER PUBLICATIONS

Kevin Steiner, Specification and Drawings for U.S. Appl. No. 16/120,996 Track Joint Assembly and Track Link Having Wear Band Structured for Anti-Scalloping filed Sep. 4, 2018.
Kevin Steiner, Specification and Drawings for U.S. Appl. No. 16/128,455 Track Link for a Track Joint Assembly Having Wear Band With Lengthwise-Varied Hardness filed Sep. 11, 2018.
Kevin Steiner, Specification and Drawings for U.S. Appl. No. 16/244,864 Track Link Having Canted Rail Surface Edges and Machine Track With Same filed Jan. 10, 2019.

* cited by examiner

TRACK LINK FOR GROUND-ENGAGING TRACK HAVING RAIL PROTRUSION FOR ANTI-SCALLOPING

TECHNICAL FIELD

The present disclosure relates generally to a ground-engaging track system, and more particularly to a track link and an idler structured for anti-scalloping.

BACKGROUND

A variety of machines utilize tracks as ground-engaging propulsion elements, notably track-type tractors. Sucks tracks typically have a plurality of rotatable track-contacting elements, including one or more idlers, track rollers, a drive sprocket, and carrier rollers. Each of two tracks at opposite sides of the machine include track links arranged in track chains forming endless loops moved about the rotating track-contacting elements during operation. Demands placed upon such machines and their associated tracks during service can be quite substantial, with high torsional loads, shearing loads, impacts, and others. Ground-engaging tracks are commonly robustly built to provide an operating life of hundreds, even more preferably thousands, of field service hours despite significant stresses, strain, and material wear.

Understanding and managing wear phenomena in machine tracks has received considerable engineering attention in recent years. The wear phenomena and wear rates experienced by machine track are typically a result of how the machine is used, the skill and experience of the operator, and the particular underfoot conditions and substrate materials in the operating environment. Machines operated in sandy materials, for instance, tend to experience component wear relatively more rapidly than machines used in soil and/or clay, coal, landfill waste, or hard rock environments. Field service life of machine track tends to vary based upon the factors mentioned above as well as the design of the track components themselves.

Machine track components can be relatively expensive to service and replace, and require machine downtime, and thus engineering efforts in this field have often focused on reducing and managing wear between and among components. Track links can experience a well-known wear phenomena known as "scalloping," where a center region of the track link wears relatively rapidly. Tracks that have experienced scalloping wear will tend to have lost relatively more material in the center region than toward the ends, resulting in an uneven track rail surface. The rotating elements contacting a scalloped track will tend to bump up and down, potentially affecting ride quality and, in some instances, impacting the quality of work efforts such as grading that are performed by the machine. Some tractor types tend to be more susceptible than others to degradation of performance and/or ride quality than others. One strategy for addressing scalloping is set forth in U.S. Pat. No. 9,045,180, where track links are formed such that their upper rail surfaces include sacrificial wear material in a convex longitudinal profile that delays scallop formation.

SUMMARY OF THE INVENTION

In one aspect, a track link for a ground-engaging track includes an elongate link body having an inboard link side, an outboard link side, a first link strap having a first track pin bore formed therein and extending between the inboard link side and the outboard link side, a second link strap having a second track pin bore formed therein and extending between the inboard link side and the outboard link side, and a middle section. The elongate link body further includes a lower shoe-mounting surface, and an upper rail surface. The upper rail surface includes a central pad formed on the middle section, a first leg extending from the central pad onto the first link strap, and a second leg extending from the central pad onto the second link strap. The middle section of the elongate link body includes an inboard rail protrusion, projecting from the inboard link side, and the central pad incudes an anti-scalloping bump-out formed on the inboard rail protrusion.

In another aspect, a track link for a ground-engaging track includes an elongate link body having an inboard link side, an outboard link side, a first link strap having a first track pin bore formed therein and extending between the inboard link side and the outboard link side, a second link strap having a second track pin bore formed therein and extending between the inboard link side and the outboard link side, and a middle section. The elongate link body further includes a lower shoe-mounting surface, and an upper rail surface. The upper rail surface includes an outboard edge, and an inboard edge, and forms a central pad upon the middle section that extends longitudinally between the first link strap and the second link strap, and latitudinally between the outboard edge and the inboard edge. The central pad includes a scalloping-insensitive first region adjacent to the first link strap, a scalloping-insensitive second region adjacent to the second link strap, and a scalloping-sensitive middle region. The scalloping-sensitive middle region has a diameter that is enlarged, relative to diameters of the scalloping-insensitive first region and the scalloping-intensive second region, to provide an anti-scalloping surface area for retarding scalloping of the upper rail surface.

In still another aspect, a track link for a ground-engaging track includes an elongate link body having an inboard link side, an outboard link side, a first link strap having a first track pin bore formed therein and extending between the inboard link side and the outboard link side, a second link strap having a second track pin bore formed therein and extending between the inboard link side and the outboard link side, and a middle section. The elongate link body further includes a lower shoe-mounting surface, and an upper rail surface. The upper rail surface includes an outboard edge, and an inboard edge, and forms a central pad upon the middle section extending between the first link strap and the second link strap, and between the outboard edge and the inboard edge. The inboard edge extends longitudinally between the first link strap and the second link strap, and has an inboard edge profile that is bumped-out, in an inboard direction, within the middle section to provide a locally enlarged surface area of the central pad for retarding scalloping of the upper rail surface.

DETAILED DESCRIPTION

Figure 1:
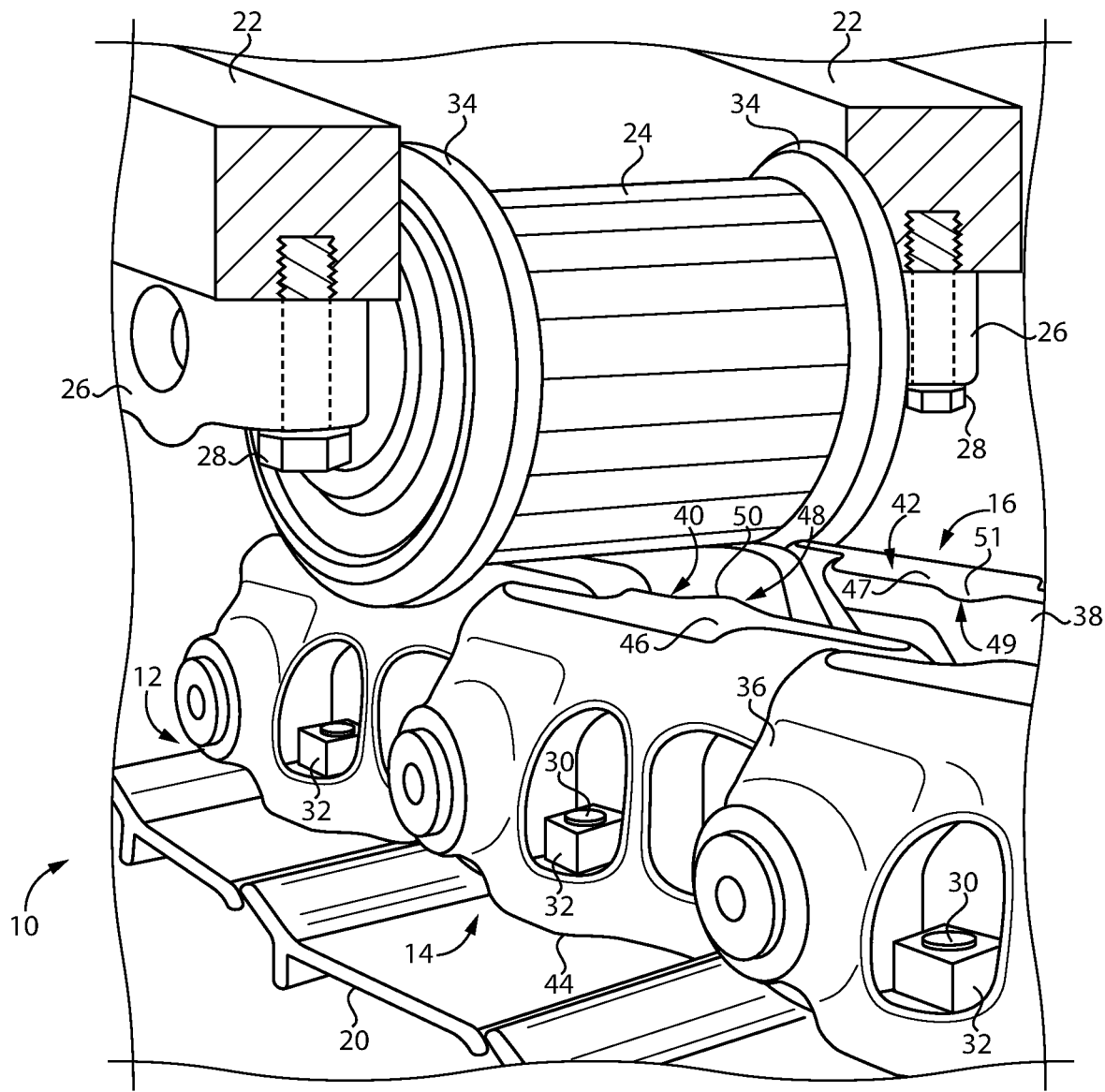
FIG. 1 is a diagrammatic view of a portion of a ground-engaging track system, according to one embodiment.
Figure 2:
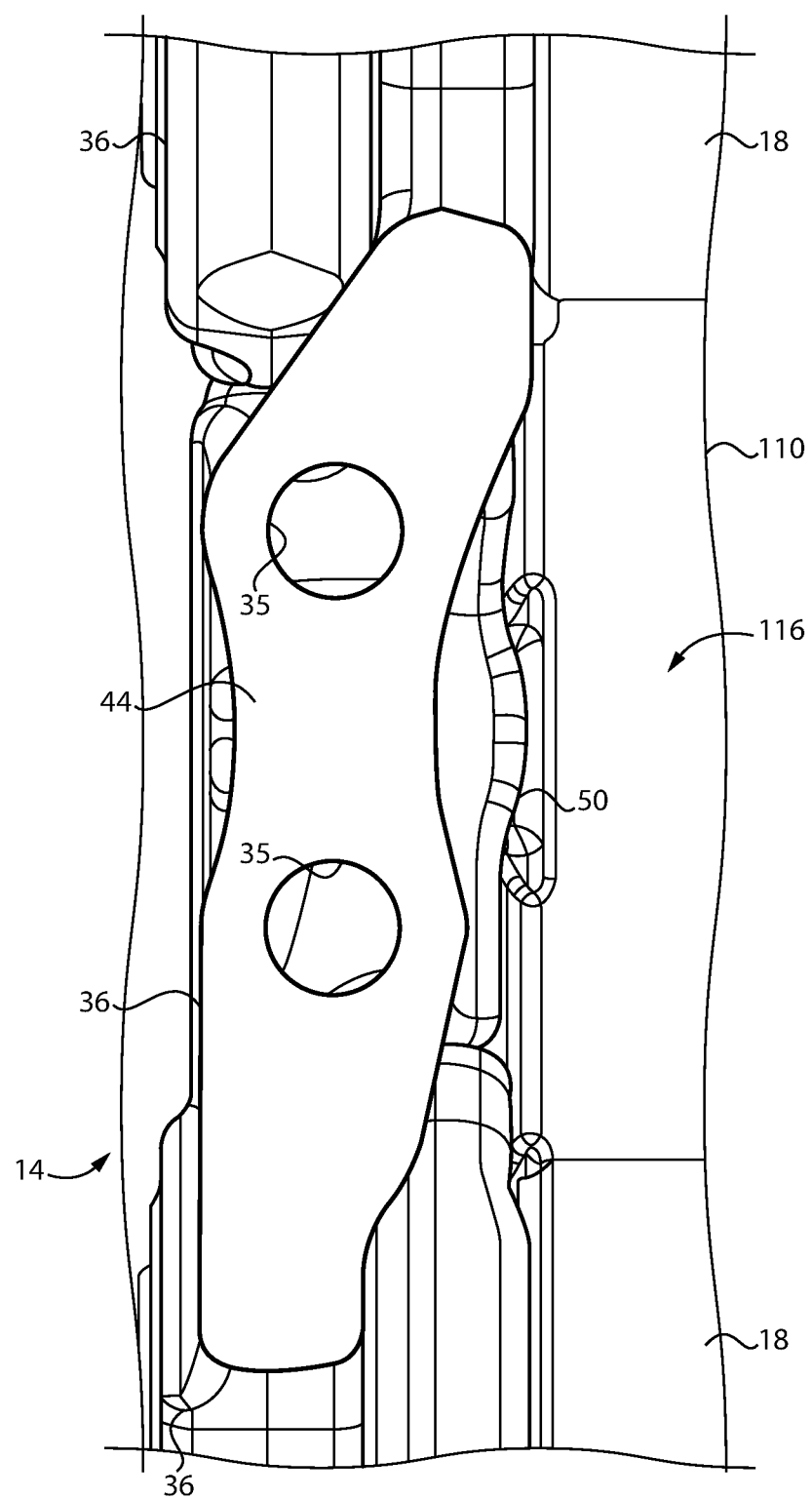
FIG. 2 is another diagrammatic view of a portion of the ground-engaging track system of FIG. 1.

Referring to FIG. 1, there is shown a ground-engaging track system 10 for a machine, according to one embodiment. Ground-engaging track system (hereinafter "track system 10") can be used in a track-type tractor having field service applications in construction, mining, forestry, or other industries. Track system 10 includes a track 12 having a first track chain 14 and a second track chain 16, and is structured to form an endless loop extending about a plurality of rotatable track-contacting elements. First track chain 14 and second track chain 16 each include track links 36 and 38, respectively, in an end-to-end arrangement, and having, respectively, a first track rail 40 and a second track rail 42. Referring also to FIG. 2, track 12 includes a plurality of track pins 18 coupling first track chain 14 to second track chain 16. Track links 36 and track links 38 in first track chain 14 and second track chain 16 each include a lower shoe-mounting surface 44, illustrated in a track link 36 of track chain 14 in FIG. 2, and an upper rail surface 46 and 47, respectively. Upper rail surface 46 and upper rail surface 47 form segments of the respective first track rail 40 and second track rail 42.

Also depicted in FIG. 1 is a track roller frame 22, and a track roller 24 coupled by way of mounts 26 to track roller frame 22 using bolts 28. Track system 10 can be a so-called hard-bottom track system for a hard-bottom tractor, where track roller 24, and other track rollers not illustrated in FIG. 1, are rigidly mounted to track roller frame 22. Hard-bottom tractors are commonly used in applications where a substrate material in a work area is graded to a relatively level, or relatively precisely contoured, elevation. With the appropriate use of monitoring and control equipment, and operator skill, hard-bottom tractors have been demonstrated to be well suited for such applications including construction sites, golf courses road and parking lot substrates, and still others. Such applications can differ from those of tractors where a suspension system is provided for managing shocks and vibrations that can be transmitted between a track and a track roller frame by way of track rollers or other components. As will be further apparent from the following description, track system 10 is adapted for retarding scallop formation in track links 36 and 38 over time, implementing design strategies for hard-bottom tractors where certain known anti-scalloping techniques may be undesirable or inferior.

Ground-engaging track shoes 20 may be attached to first track chain 14 and second track chain 16, and in the illustrated embodiment utilize bolts 30 extending through track links 36 and 38, and through track shoes 20 and nuts 32 in a generally conventional manner. Track roller 24 rotates in contact with first track rail 40 and second track rail 42, and includes roller flanges 34 that are positioned outboard of first track rail 40 and second track rail 42, while track roller 24 and other track rollers not illustrated support a majority of a weight of the associated machine. Track links 36 and 38 in first track chain 14 and second track chain 16 each further include an inboard rail protrusion 48 and 49, respectively, extending from inboard link body sides of track links 36 and 38. Upper rail surfaces 46 and 47 each include an anti-scalloping bump-out 50 and 51, formed upon the respective inboard rail protrusions 48 and 49. In the illustrated embodiment track links 36 and 38 are mirror images of one another, and description of track links 36 should be understood to refer by way of analogy to track links 38. Moreover, description of a track link 36 in the singular should be understood to refer to any of the track links in first track chain 14, or in track chain 16. In the illustration of FIG. 2, shoe bolting bores 35 are shown as they might appear with the associated track shoe 20 removed. Also shown in FIG. 2 is an idler 110 having an outer idler rim 116. Idler 110 may be designed to rotate passively in contact with first track rail 40 and second track rail 42, and is specially shaped to accommodate anti-scalloping bump-outs 50 and 51, as further discussed herein.

Figure 3:
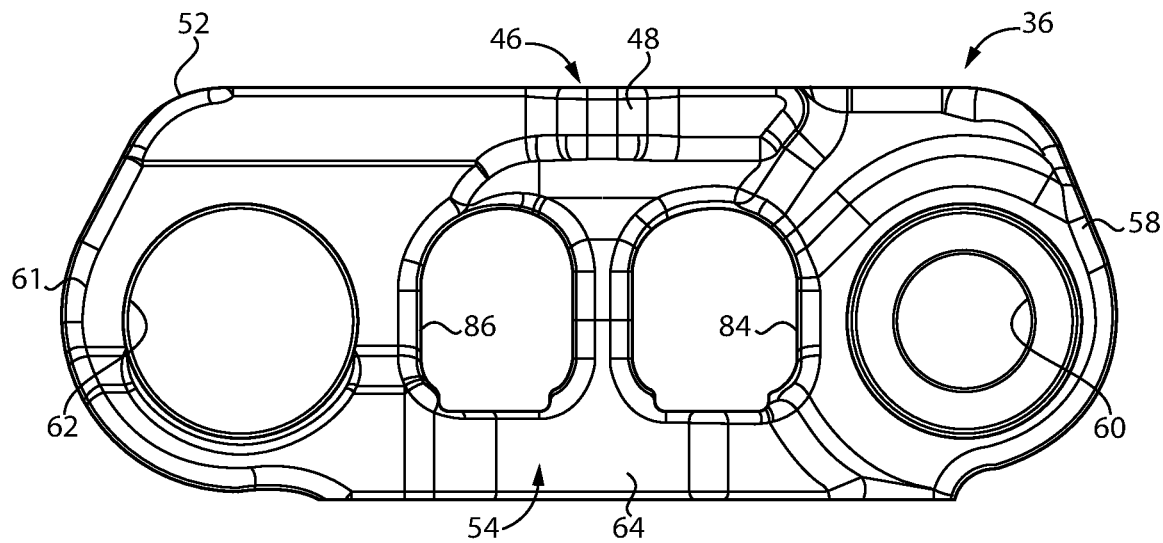
FIG. 3 is a side view of a track link, according to one embodiment.
Figure 4:
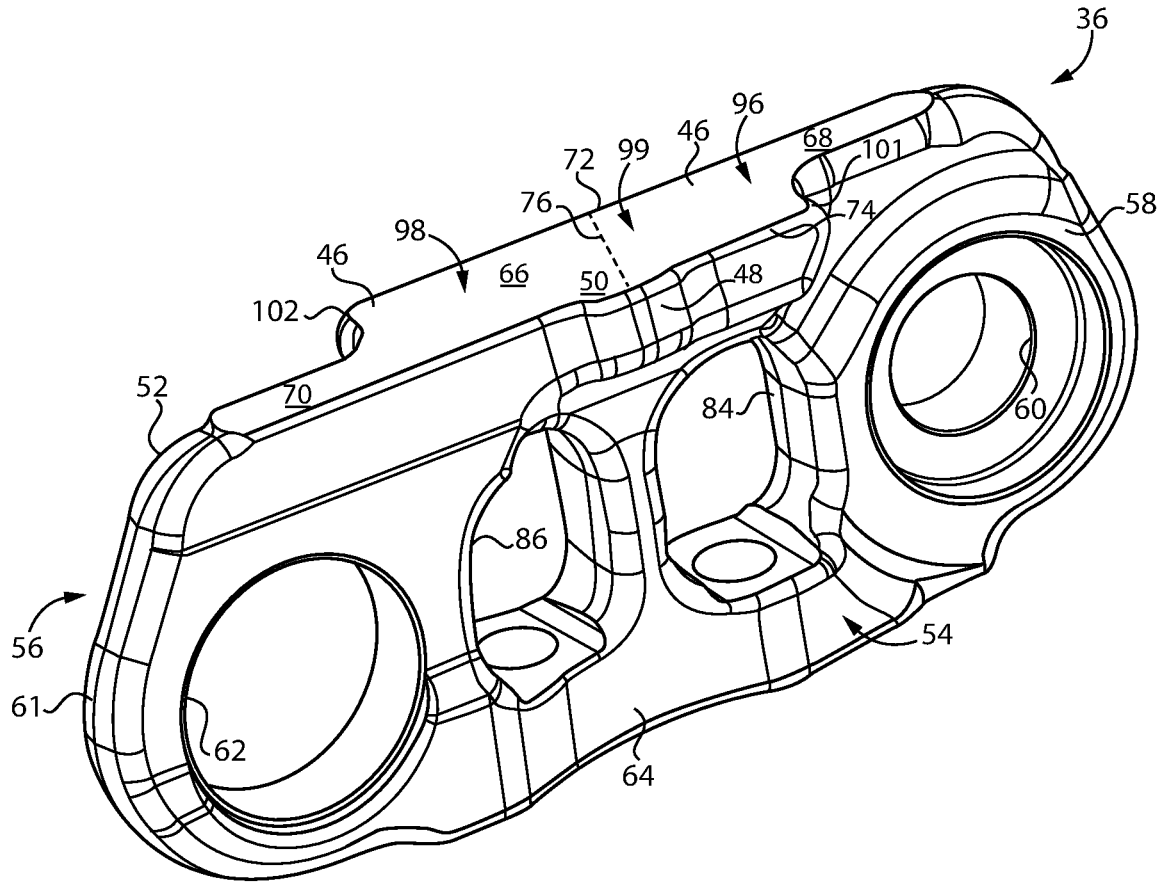
FIG. 4 is a perspective view of a track link, according to one embodiment.

Referring now to FIGS. 3 and 4, there are shown features of track link 36 in additional detail. Track link 36 includes an elongate link body 52 having an inboard link side 54, an outboard link side 56, a first link strap 58, and a second link strap 61. First link strap 58 has a first track pin bore 60 formed therein and extending between inboard link side 54 and outboard link side 56. Second link strap 61 has a second track pin bore 62 formed therein and extending between inboard link side 54 and outboard link side 56. Elongate link body 52 further includes a middle section 64. Upper rail surface 46 includes a central pad 66 formed on middle section 64. A first leg 68 of upper rail surface 46 extends from central pad 66 onto first link strap 58. A second leg 70 of upper rail surface 46 extends from central pad 66 onto second link strap 61. As noted above, track link 36 also includes an inboard rail protrusion 48. Inboard rail protrusion 48 projects from inboard link side 54. Central pad 66 includes an anti-scalloping bump-out 50 formed on inboard rail protrusion 48. During operation, idler 110 may slide into and out of contact with upper rail surface 46, giving rise to a relatively greater rate of material wear generally toward a middle part of central pad 66 as compared to first leg 68 and second leg 70, and other parts of central pad 66 not subjected to sliding contact. First leg 68 and second leg 70 are laterally offset from one another, and first leg 68, second leg 70, and central pad 66 define a common plane. The relatively greater rate of material wear upon central pad 66 would, unless ameliorated, tend to give rise to scallop formation earlier than is desired, ultimately causing upper rail surface 46 to assume a concave form, potentially affecting ride quality and/or machine performance. As further discussed herein, inboard rail protrusion 58, and in particular anti-scalloping bump-out 50, provides additional available wear material by way of locally increased surface area that retards scallop formation in response to contact with idler 110. Since sliding contact tends not to occur, or significantly less so, when idler 110 comes into and out of contact with first leg 68 and second leg 70 than with parts of central pad 66, the rate of material wear upon first leg 68 and second leg 70 can be relatively slow, and these parts of upper rail surface 46 can be considered relatively scalloping-insensitive compared to regions where sliding contact does occur. Analogously, parts of central pad 66 adjacent to first leg 68 and second leg 70 can also be relatively scalloping-insensitive. Central pad 66 may thus be understood to have a scalloping-insensitive first region 96 adjacent to first link strap 58, and a scalloping-insensitive second region 98 adjacent to second link strap 61. Central pad 66 is also understood to include a scalloping-sensitive middle region 99 that extends longitudinally between scalloping-insensitive first region 96 and scalloping-insensitive second region 98. Scalloping-sensitive middle region 99 includes a diameter that is enlarged, relative to diameters of scalloping-insensitive first region 96 and scalloping-insensitive second region 98, as further discussed herein, to provide the locally enlarged anti-scalloping surface area for retarding scalloping of upper rail surface 46 in response to contact with idler 110.

Figure 5:
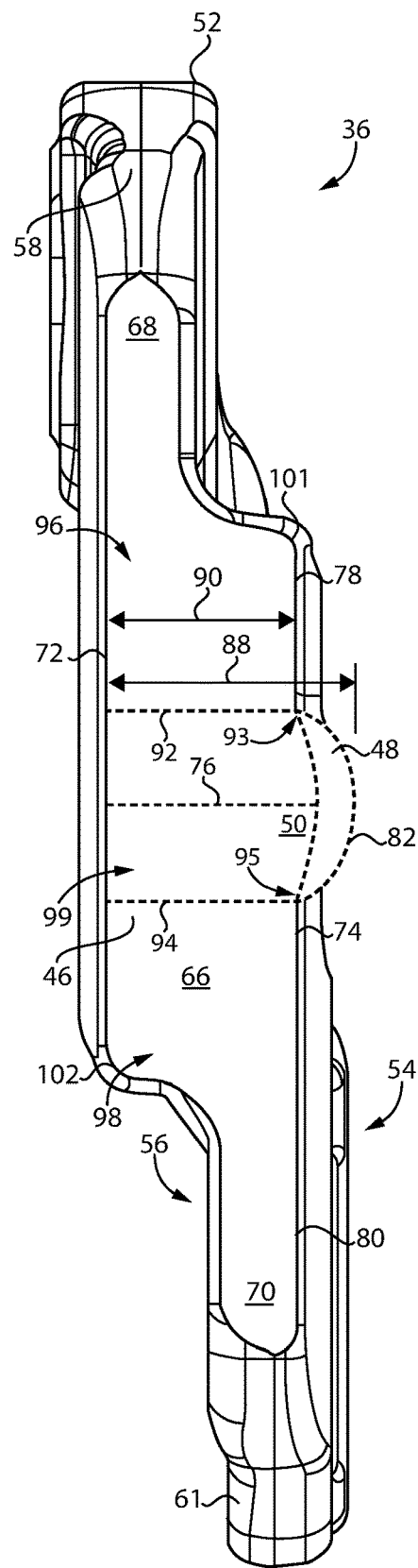
FIG. 5 is a top view of a track link, according to one embodiment.
Figure 6:
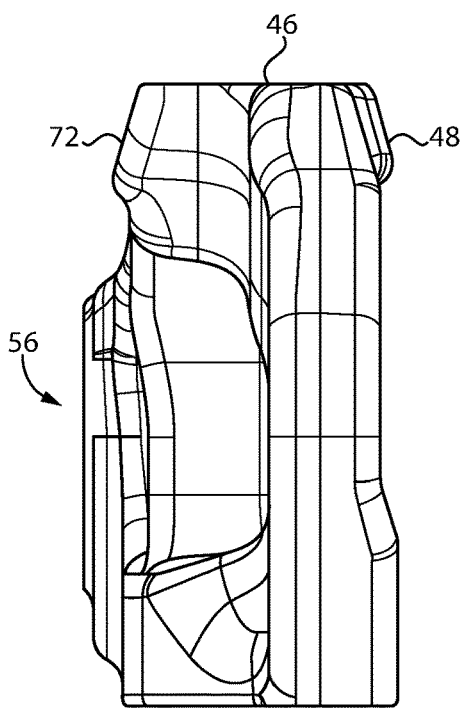
FIG. 6 is an end view of a track link, according to one embodiment.
Figure 7:
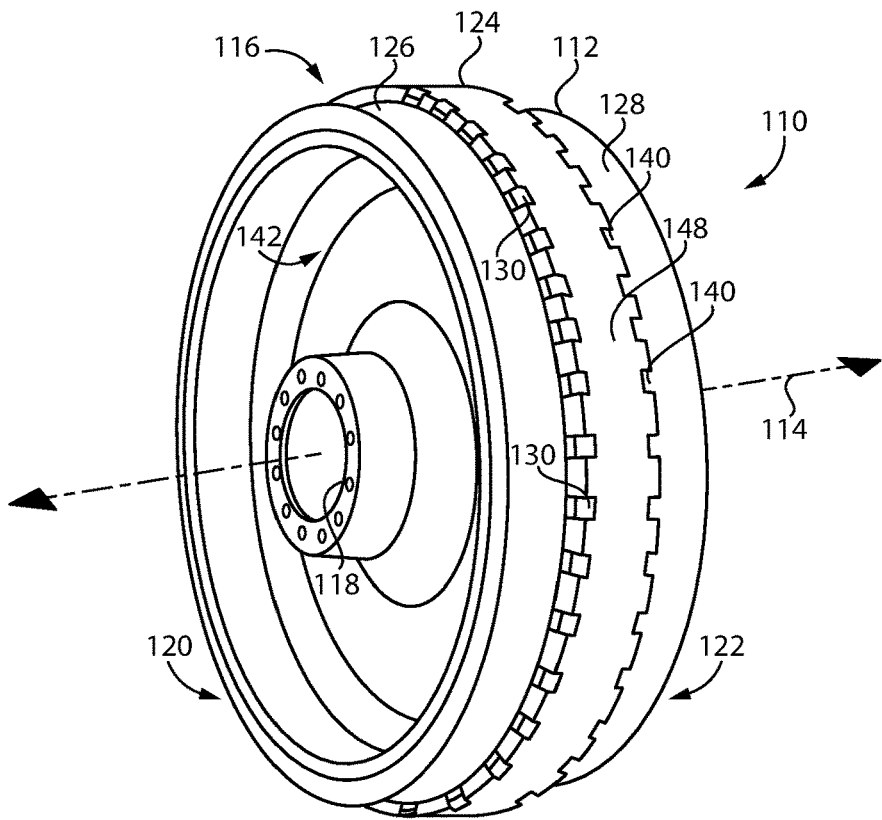
FIG. 7 is a perspective view of an idler, according to one embodiment.
Figure 8:
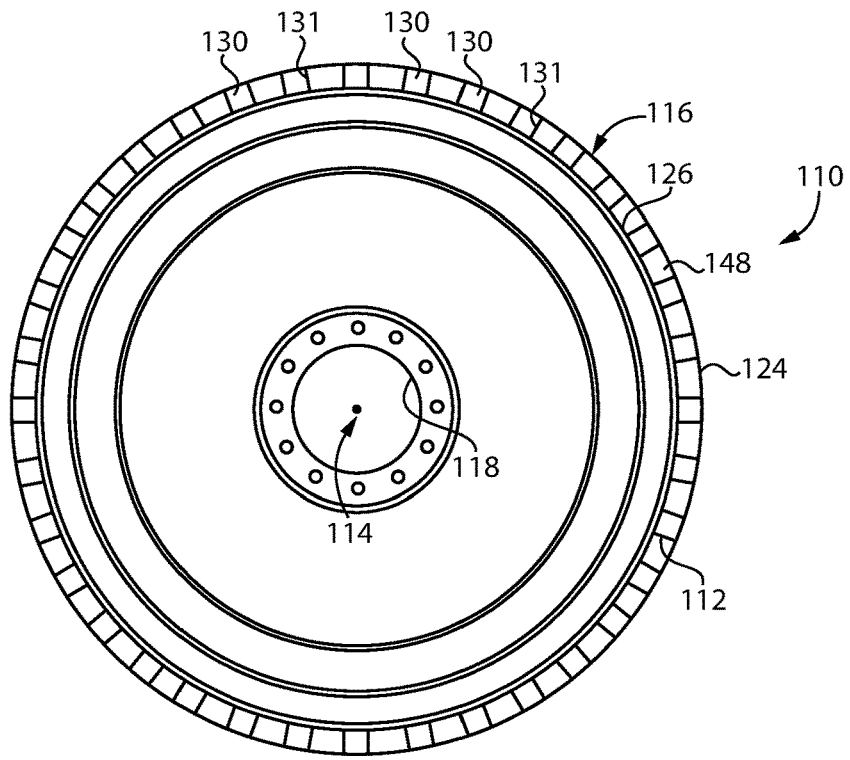
FIG. 8 is a side view of an idler, according to one embodiment.

Referring also now to FIG. 5 and FIG. 6, upper rail surface 46 includes an outboard edge 72 and an inboard edge 74, and defines a latitudinal midline 76 extending between inboard edge 74 and outboard edge 72. Anti-scalloping bump-out 50 extends fore and aft of latitudinal midline 76. In a practical implementation strategy, anti-scalloping bump-out 50 is centered fore-aft, and symmetrical, about latitudinal midline 76. It can also be noted, particularly in reference to FIG. 5, that outboard edge 72 has an outboard edge profile extending substantially an entirety of a longitudinal length of central pad 66 and first leg 68, that is linear. Inboard edge 74 includes an inboard edge profile having a first linear segment 78, a second linear segment 80, each parallel to the outboard edge profile, and a bumped-out segment 82 extending between first linear segment 78 and second linear segment 80. A first nut seat window 84 and a second nut seat window 86 are formed in middle section 64 on opposite sides of latitudinal midline 76. First linear segment 78 overlaps, longitudinally, with first nut seat window 84. Second linear segment 80 overlaps, longitudinally, with second nut seat window 86. At least a portion of inboard rail protrusion 48, is longitudinally between first nut seat window 84 and second nut seat window 86. It can also be noted from FIG. 5 that a latitudinal first line 92 is defined at a first origin 93 of anti-scalloping bump-out 50, corresponding to an intersection of bumped-out segment 82 and first linear segment 78. A latitudinal second line 94 is defined at a second origin 95 of anti-scalloping bump-out 50, corresponding to an intersection of bumped-out segment 82 and second linear segment 80. Scalloping-insensitive first region 96 can be understood as the region of upper rail surface 46 and central pad 66 that extends between latitudinal first line 92 and first leg 68. Scalloping-insensitive second region 98 can be understood as the portion of upper rail surface 46 and central pad 66 that extends from latitudinal second line 94 to second leg 70. An anti-scalloping surface area of central pad 66 is defined by central pad 66 as bounded fore-aft by latitudinal first line 92 and latitudinal second line 94. A first corner or transition 101 adjoins first linear segment 78 and transitions to first leg 68. A second corner or transition 102 is generally opposite to first transition 101 upon track link 36.

It will be recalled that scalloping-sensitive middle region 99 has a diameter that is enlarged, relative to diameters of scalloping-insensitive first region 96 and scalloping-insensitive second region 98, providing an enlarged or expanded anti-scalloping surface area for retarding scalloping of upper rail surface 46 in response to contact with idler 110. With continued reference to FIG. 5, there is shown at numeral 88 the bumped-out diameter formed by central pad 66 within anti-scalloping bump-out 50. A second diameter 90 is formed by central pad 66 outside of anti-scalloping bump-out 50. FIG. 5 shows in dashed lines one example range of bumped-out diameter 88 relative to second diameter 90. In other words, it has been discovered that a range of diameters formed by anti-scalloping bump-out 50 can be well-suited to provision of the enlarged surface area for retarding scalloping while balancing factors such as link size and shape, manufacturability, and compatibility with other components of track system 10 as further discussed herein.

In one practical implementation strategy, a ratio of bumped-out diameter 88 to second diameter 90 is from 1.2:1 to 1.6:1. In a refinement, the ratio of bumped-out diameter 88 to second diameter 90 is from 1.3:1 to 1.4:1. As discussed above, the anti-scalloping surface area is bounded fore-aft by latitudinal first line 92 and latitudinal second line 94. Anti-scalloping bump-out 50 may form from 15% to 30% of the anti-scalloping surface area that is, the total surface area of upper rail surface 46 between lines 92 and 94. In a refinement, anti-scalloping bump-out 50 forms from 17% to 19% of the anti-scalloping surface area. In one more specific example, a fore-aft running length between origin 93 and origin 94 may be about 4 millimeters. Bumped-out diameter 88 in this example may be about 6 millimeters, and second diameter 90 may be about 24 millimeters. It will further be appreciated that second diameter 90 in scalloping-insensitive first region 96 may be equal to an analogously defined diameter in scalloping-insensitive second region 98. The term "about" can be understood to be approximate, as will be understood by one in the relevant art, or within measurement error. Bumped-out segment 82 forms a boundary of the locally enlarged surface area.

Turning now to features of idler 110, and in reference now to FIGS. 7-10, idler 110 may be structured for mounting to track roller frame 22, and includes an idler body 112 defining an axis of rotation 114. Idler body 112 is one-piece in the illustrated embodiment, but could include an idler hub with one or more attached outer rim pieces in others. Idler 110 also includes an outer idler rim 116 extending circumferentially around axis of rotation 114. It will be recalled, as noted in reference to FIG. 2, that idler 110 may be structurally designed to be compatible with the inboard profiles of track links 46 and 48 in first track chain 14 and second track chain 16. Axis of rotation 114 extends between a first axial idler body end 120 and a second axial idler body end 122, with central bore 118 being structured to receive a support shaft for rotatably mounting idler 110 in track roller frame 22. Outer idler rim 116 includes a central flange 124 projecting radially outward, and flanked by a first rail contact surface 126 extending axially inward from first axial idler body end 120 and a second rail contact surface 128 extending axially inward from second axial idler body end 122. A recess 142 is formed at a first axial side of idler body 112, and a second recess 144 is formed at a second axial side of idler body 112. A thin web 146 extends radially inward from outer idler rim 116. Central flange 124 includes a cylindrical outer flange surface 148. A first set of pockets 130 are formed in central flange 124 adjacent to first rail contact surface 126 and arranged in a regular circumferential distribution about axis of rotation 114. A second set of pockets 140 are formed in central flange 124 adjacent to second rail contact surface 128 and arranged in a regular circumferential distribution about axis of rotation 114.

First set of pockets 130 and second set of pockets 140 are arranged, respectively, in rolling register with inboard rail protrusions 48 and 49 of track links 46 and 48 in the respective first track chain 14 and second track chain 16. First set of pockets 130 and second set of pockets 140 are formed in central flange 124 and adjacent, respectively, to first rail contact surface 26 and second rail contact surface 28. As noted, first set of pockets 130 and second set of pockets 140 are arranged in rolling register with inboard rail protrusions 48 and 49. Accordingly, as idler 110 rotates in contact with track 12, with first rail contact surface 126 riding on first track rail 40 and second rail contact surface 128 riding on second track rail 42, inboard rail protrusions 48 and 49 may be received into and then out of first set of pockets 130 and second set of pockets 140, respectively.

In one implementation, additional pockets 131 are formed in central flange 124 adjacent to first rail contact surface 126, but positioned not in rolling register with inboard rail protrusion(s) 48. Analogously, additional pockets 141 may be formed in central flange 124 adjacent to second rail contact surface 128 but not in rolling register with inboard rail protrusions 49. Pockets 131 may be understood as a third set of pockets and pockets 141 as a fourth set of pockets, with each of third set of pockets 131 and fourth set of pockets 141 indexed to, but not in rolling register with, inboard rail protrusions 48 and 49 of track links 46 and 48 in first track chain 14 and second track chain 16, respectively. This arrangement can enable idler 110 to be rotated relative to components of track 12 to compensate for wear, for example. Another way to understand this configuration is that some of the pockets in idler 110 that accommodate rail protrusions will receive the inboard rail protrusions during operation, and some will not, but will instead be positioned between inboard rail protrusions of adjacent track links. Pockets 130, 131, and 140, 141, may otherwise be identically shaped and arranged, such that idler 110 can be rotated an amount equal to one track pitch distance, one-half track pitch distance, one-third track pitch distance, et cetera, depending upon the number and arrangement of the pockets, to provide a new interface of idler 110 each time track 12 is serviced.

Figure 9:
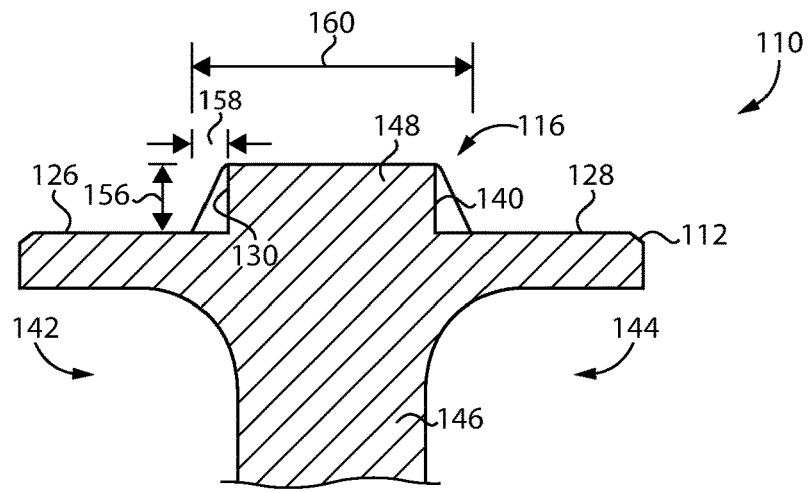
FIG. 9 is a sectioned view through a portion of an idler, according to one embodiment.
Figure 10:
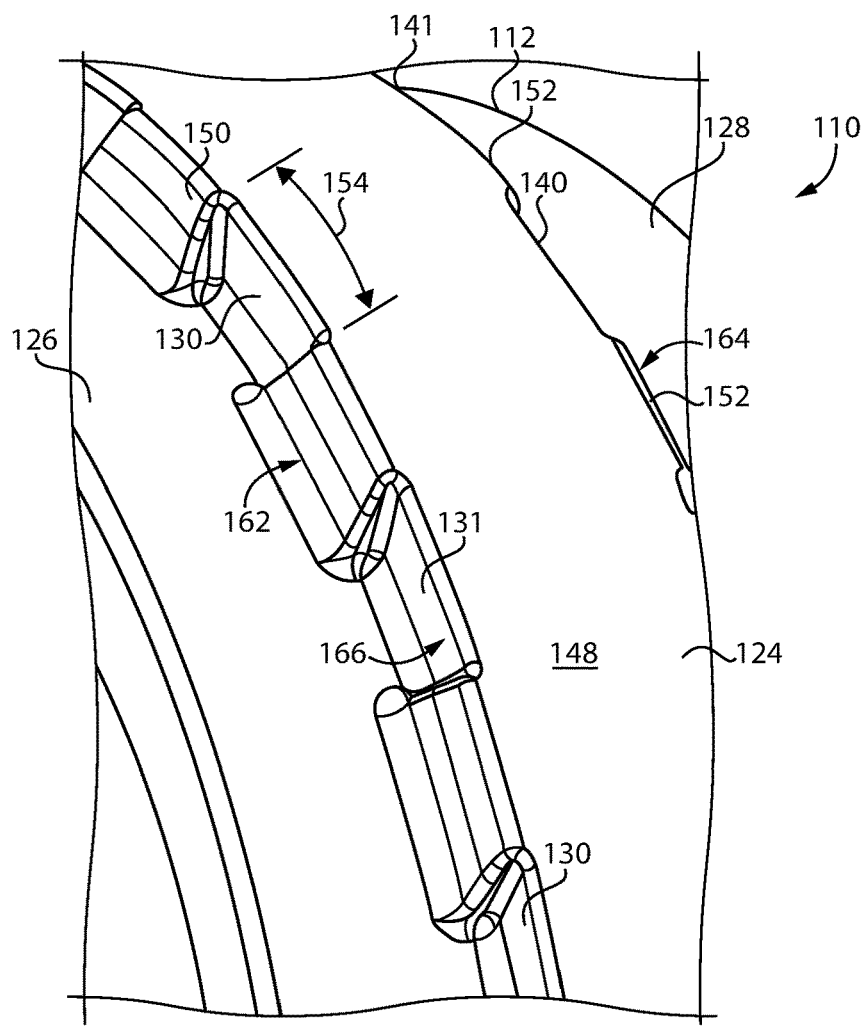
FIG. 10 is a perspective view of a portion of an idler, according to one embodiment.

Pockets 130 in the first set and pockets 140 in the second set may be generally identical, but mirror images of one another. Pockets 130 and pockets 140 may each define a pocket running length 154 extending circumferentially around axis of rotation 114, a pocket axial depth 156, and a pocket radial depth 158. Pocket running length 154 may be greater than pocket radial depth 158, and pocket radial depth 158 may be greater than pocket axial depth 156. Idler body 112 may further include a first set of side lugs 150 in an alternating arrangement with first set of pockets 130, and a second set of side lugs 152 in an alternating arrangement with second set of pockets 140. As noted above, cylindrical outer flange surface 148 is formed on central flange 124. Side lugs 150 and side lugs 152 each include outer lug faces 162 and 164, respectively. Outer lug faces 162 and 164 slope from first rail contact surface 126 and second rail contact surface 128, respectively, in axially inward and radially inward directions toward cylindrical outer flange surface 148. It can also be noted that first set of pockets 130 each open in a radially outward direction, and in a first axial direction toward first idler body axial end 120. Second set of pockets 140 each open in a radially outward direction, and in a second axial direction, toward second axial idler body end 122. Side lugs 150 and side lugs 152 may each have a trapezoidal shape. Pockets 130 and pockets 140 may each have an inverted trapezoidal shape, and form a taper opening in a radially outward direction. With reference in particular now to FIGS. 9 and 10, central flange 124 defines a flange axial thickness 160. A radio of pocket axial depth 158 to flange axial thickness 160 may be from 0.1:1 to 0.3:1. In a refinement, the ratio of pocket axial depth 158 to flange axial thickness 160 is from 0.13:1 to 0.27:1. In one specific example, pocket axial depth 158 may be from about 4 millimeters to about 10 millimeters. These relative proportions and dimensions enable idler 110 to fit with and accommodate tracks such as track 12 equipped with inboard rail protrusions for retarding scalloping.

INDUSTRIAL APPLICABILITY

Referring to the drawings generally, as track system 10 is operated, track 12 may be advanced about the various rotatable track-contacting elements in forward directions, reverse directions, and started, stopped, and reversed many times. As track 12 rotates about idler 110, as well as a second idler where used, upper rail surfaces 46 and 47 will contact rail contact surfaces 126 and 128. Pivoting between links 46 and 48 in the respective track chains 14 and 16 as links 46 and 48 rotate into and out of contact with idler 110 will tend to cause sliding in a contact "patch" that is generally centered about the latitudinal midline of each track link, corresponding to scalloping-sensitive region 99. The sliding contact wears away material at a relatively greater rate in scalloping-sensitive region 99 than at other locations of upper rail surface 46. The locally enlarged surface area provided by anti-scalloping bump-out 50 upon inboard rail protrusion 48 provides additional surface area of material to be worn as compared to other parts of the link. Accordingly, even though the wear conditions are relatively more severe at the portions of the links where sliding contact occurs, the effective wear rate into elongate link body 42 from upper rail surface 46 is slowed, ultimately causing the track links to wear more uniformly longitudinally along the upper rail surfaces, and scalloping more slowly than what is typically observed.

With regard to idler 110, in certain known idler configurations, a central flange would contact track links for guiding purposes approximately at a longitudinal center of the track link upon the inboard side. By providing the pocketed configuration in idler 110, the additional material added to the track links does not obstruct or otherwise interfere with intended track guiding operation, and the locations of such guiding contact are moved, relative to non-pocketed idlers, into the pockets themselves.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:
1. A track link for a ground-engaging track comprising:
an elongate link body including an inboard link side, an outboard link side, a first link strap having a first track pin bore formed therein and extending between the inboard link side and the outboard link side, a second link strap having a second track pin bore formed therein and extending between the inboard link side and the outboard link side, and a middle section;
the elongate link body further having a lower shoe-mounting surface, and an upper rail surface;

the upper rail surface including a central pad formed on the middle section, a first leg extending from the central pad onto the first link strap, and a second leg extending from the central pad onto the second link strap; and the middle section of the elongate link body including an inboard rail protrusion, projecting from the inboard link side, and the central pad including an anti-scalloping bump-out formed on the inboard rail protrusion; and the upper rail surface includes an outboard edge and an inboard edge, and defines a latitudinal midline extending between the inboard edge and the outboard edge, and the anti-scalloping bump-out extends fore and aft of the latitudinal midline.

2. The track link of claim 1 wherein the first leg and the second leg are laterally offset from one another, and the first leg, the second leg, and the central pad define a common plane.

3. The track link of claim 1 wherein the outboard edge has an outboard edge profile that is linear, and the inboard edge includes an inboard edge profile having a first linear segment, a second linear segment, each parallel to the outboard edge profile, and a bumped-out segment extending between the first linear segment and the second linear segment.

4. The track link of claim 3 wherein:
a first nut seat window and a second nut seat window are formed in the middle section on opposite sides of the latitudinal midline;
the first linear segment overlaps, longitudinally, with the first nut seat window, and the second linear segment overlaps, longitudinally, with the second nut seat window.

5. The track link of claim 1 wherein the upper rail surface has a bumped-out diameter formed by the central pad within the anti-scalloping bump-out, and a second diameter formed by the central pad outside of the anti-scalloping bump-out, and a ratio of the bumped-out diameter to the second diameter is from 1.2:1 to 1.6:1.

6. The track link of claim 5 wherein the ratio of the bumped-out diameter to the second diameter is from 1.3:1 to 1.4:1.

7. The track link of claim 1 wherein:
a latitudinal first line is defined at a first origin of the anti-scalloping bump-out;
a latitudinal second line is defined at a second origin of the anti-scalloping bump-out; and
an anti-scalloping surface area is defined by the central pad as bounded fore-aft by the latitudinal first line and the latitudinal second line.

8. The track link of claim 7 wherein the anti-scalloping bump-out forms from 15% to 30% of the anti-scalloping surface area.

9. The track link of claim 8 wherein the anti-scalloping bump-out forms from 17% to 19% of the anti-scalloping surface area.

10. A track link for a ground-engaging track comprising:
an elongate one-piece link body including an inboard link side, an outboard link side, a first link strap having a first track pin bore formed therein and extending between the inboard link side and the outboard link side, a second link strap having a second track pin bore formed therein and extending between the inboard link side and the outboard link side, and a middle section;
the elongate link body further having a lower shoe-mounting surface, and an upper rail surface;
the upper rail surface including an outboard edge, and an inboard edge, and forming a central pad upon the middle section that extends longitudinally between the first link strap and the second link strap, and latitudinally between the outboard edge and the inboard edge;
the central pad having a scalloping-insensitive first region adjacent to the first link strap, a scalloping-insensitive second region adjacent to the second link strap, and a scalloping-sensitive middle region; and
the scalloping-sensitive middle region having a diameter that is enlarged, relative to diameters of the scalloping-insensitive first region and the scalloping-insensitive second region, to provide an anti-scalloping surface area for retarding scalloping of the upper rail surface, wherein the track link includes an inboard rail protrusion, projecting from the inboard link side, and the scalloping-sensitive middle region includes an anti-scalloping bump-out formed on the inboard rail protrusion.

11. The track link of claim 10 wherein:
a latitudinal first line is defined at a first origin of the anti-scalloping bump-out;
a latitudinal second line is defined at a second origin of the anti-scalloping bump-out; and
the anti-scalloping surface area extends from the latitudinal first line to the latitudinal second line, and from 15% to 30% of the anti-scalloping surface area is formed on the anti-scalloping bump-out.

12. The track link of claim 11 wherein from 17% to 19% of the anti-scalloping surface area is formed on the anti-scalloping bump-out.

13. The track link of claim 11 wherein the upper rail surface has a bumped-out diameter between the inboard edge and the outboard edge within the scalloping-sensitive middle region, and a second diameter that is equal within each of the scalloping-insensitive first region and the scalloping-insensitive second region.

14. The track link of claim 13 wherein a ratio of the bumped-out diameter to the second diameter is from 1.2:1 to 1.6:1.

15. The track link of claim 14 wherein the ratio of the bumped-out diameter to the second diameter is from 1.3:1 to 1.4:1.

16. A track link for a ground-engaging track comprising:
an elongate link body including an inboard link side, an outboard link side, a first link strap having a first track pin bore formed therein and extending between the inboard link side and the outboard link side, a second link strap having a second track pin bore formed therein and extending between the inboard link side and the outboard link side, and a middle section;
the elongate link body further having a lower shoe-mounting surface, and an upper rail surface;
the upper rail surface including an outboard edge, and an inboard edge, and forming a central pad upon the middle section extending between the first link strap and the second link strap, and between the outboard edge and the inboard edge; and
the inboard edge extending longitudinally between the first link strap and the second link strap, and having an inboard edge profile that is bumped-out, in an inboard direction, at a location within the middle section to provide a locally enlarged surface area of the central pad for retarding scalloping of the upper rail surface; and
the inboard link side including an inboard link side profile, perpendicular to the inboard edge profile, that is bumped-out, in the inboard direction, at the location within the middle section, wherein the outboard edge has an outboard edge profile that is linear, and the inboard edge includes an inboard edge profile having a first linear segment, a second linear segment, each parallel to the outboard edge profile, and a bumped-out segment extending between the first linear segment and the second linear segment and forming a boundary of the locally enlarged surface area, wherein:

a first nut seat window and a second nut seat window are formed in the middle section;

the first linear segment overlaps, longitudinally, with the first nut seat window, and the second linear segment overlaps, longitudinally, with the second nut seat window; and the elongate link body further includes an inboard rail protrusion, and the bumped-out segment is formed by the inboard edge upon the inboard rail protrusion.

\* \* \* \* \*